United States Patent [19]

Maloney et al.

[11] Patent Number: 4,865,551
[45] Date of Patent: Sep. 12, 1989

[54] OPHTHALMOLOGIC PHANTOM SYSTEM

[76] Inventors: William F. Maloney, 2020 Ocean Front Ave., Del Mar, Calif. 92014; Deborah K. Hall, 528 Unit I, Via de la Valle, Solano Beach, Calif. 92075

[21] Appl. No.: 100,280

[22] Filed: Sep. 23, 1987

Related U.S. Application Data

[63] Continuation-in-part of Ser. No. 14,433, Feb. 13, 1987, Pat. No. 4,762,495.

[51] Int. Cl.$^4$ ............................................. G09B 23/28
[52] U.S. Cl. ......................................... 434/271; 623/4
[58] Field of Search ................. 434/270, 271; 623/4–6

[56] References Cited

U.S. PATENT DOCUMENTS

| | | | |
|---|---|---|---|
| 1,042,815 | 10/1912 | Myers | 434/271 |
| 3,905,130 | 9/1975 | Gordon et al. | 434/271 |
| 4,136,466 | 1/1979 | Wrue | 434/271 |
| 4,253,199 | 3/1981 | Banko | 623/6 |
| 4,596,528 | 1/1986 | Lewis et al. | 434/270 |

FOREIGN PATENT DOCUMENTS

| | | | |
|---|---|---|---|
| 0649016 | 2/1979 | U.S.S.R. | 434/271 |
| 1082424A | 3/1982 | U.S.S.R. | 434/271 |

Primary Examiner—Leo P. Picard
Assistant Examiner—Jessica J. Harrison
Attorney, Agent, or Firm—Knobbe, Martens, Olson & Bear

[57] ABSTRACT

A simulated human ocular system for practicing the surgical techniques required for the removal of cataractous lenses utilizing posterior chamber lens emulsification and, optionally, the techniques required for small incision implantation and refractive surgery is provided. A human eye is generally imitated by an outer orb having three inner, connected chambers separated by membranes that correspond to the cornea, the iris, and the posterior chamber membrane. A lens phantom is releasably attached to the orb within the chamber located between the iris and the posterior chamber membrane. The lens phantom consists of a structured, water-sensitive composition, such as a cross-linked gelatin to which a water soluble polymer has been added, and is thereafter encapsulated within a transparent vinyl or vinylidene chloride copolymer film. Placement of the ocular system in a structure that duplicates the outside features of a human head, with provisions for varying the rotation and degree of ocular projection, completes this ocular model.

12 Claims, 3 Drawing Sheets

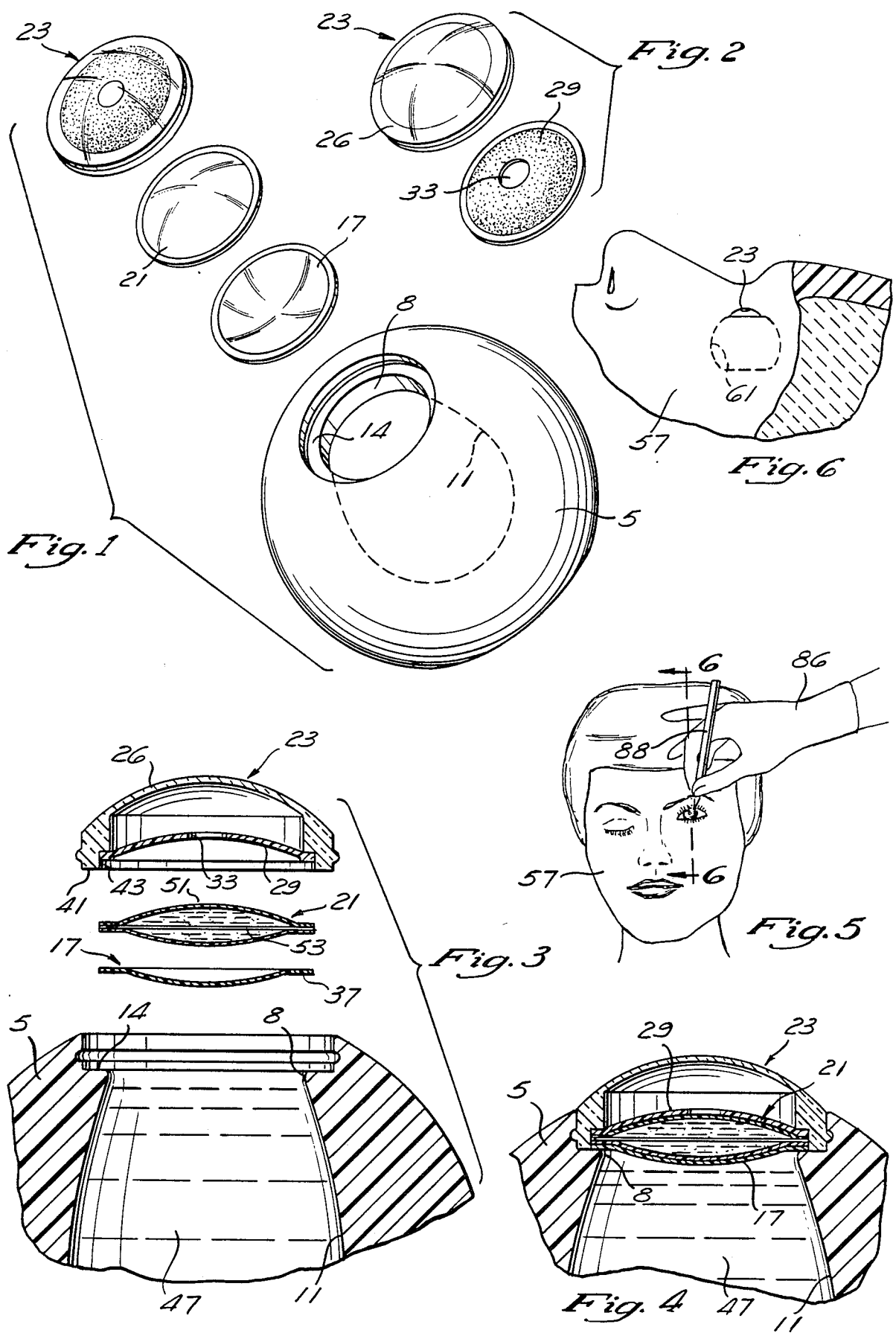

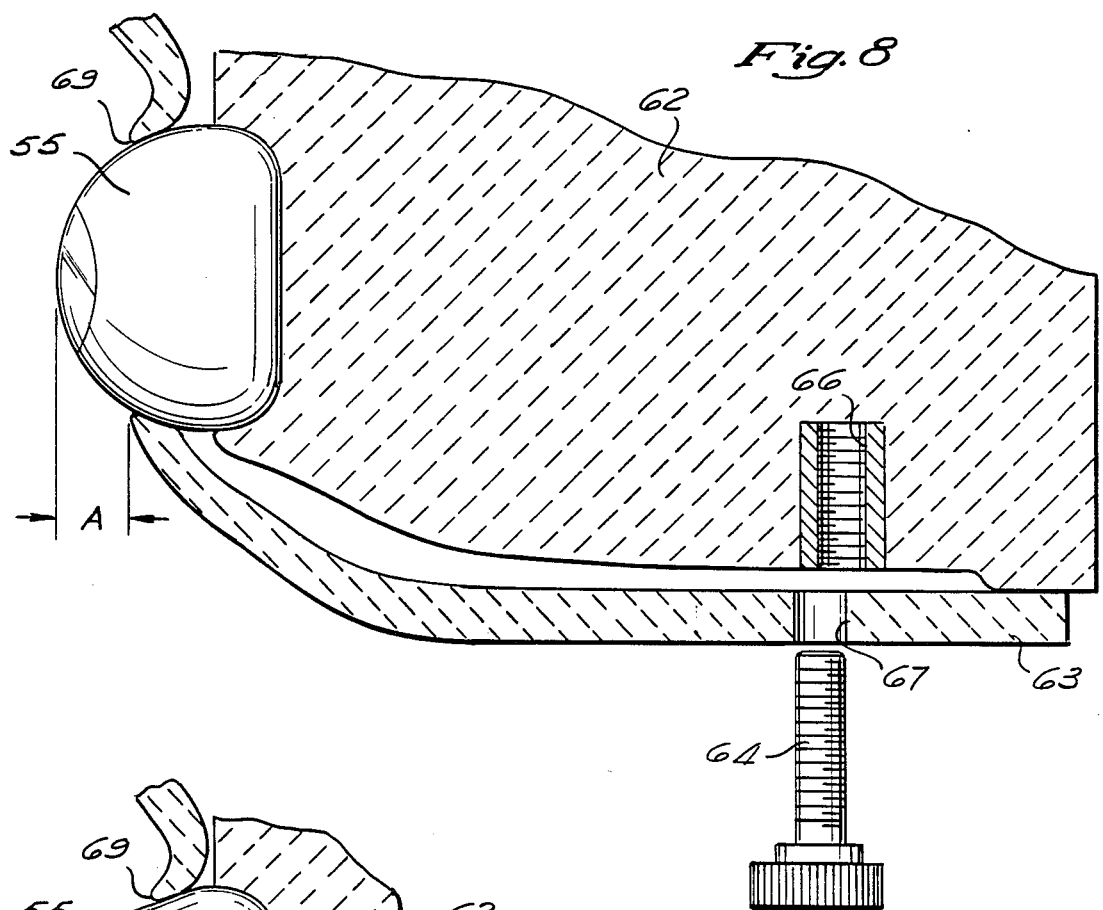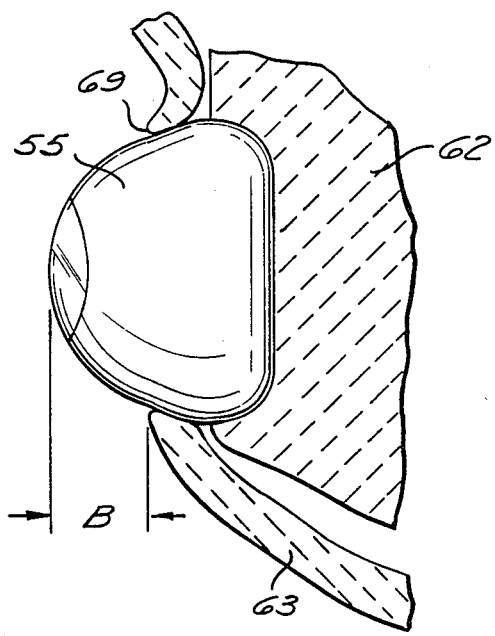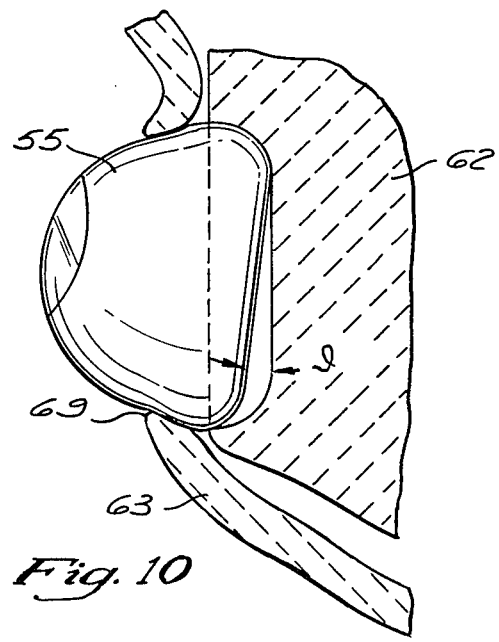

OPHTHALMOLOGIC PHANTOM SYSTEM

CROSS-REFERENCE TO RELATED APPLICATION

The present application is a continuation-in-part of U.S. Letters patent application, Ser. No. 14,433, filed Feb. 13, 1987, now U.S. Letters Pat. No. 4,762,495.

BACKGROUND OF THE INVENTION

1. Field of the Invention

The present invention relates to a medical tissue phantom for use in simulating surgical procedures, and more particularly to an ophthalmologic system, wherein a lens tissue phantom and/or a corneal tissue phantom are placed within a structure generally resembling a human eye, which is itself mounted in a simulated human head.

2. Description of the Prior Art

The human eye and the eyes of vertebrates in general, although distinguished by a variety of evolutionary modifications, share the same basic anatomical pattern. An anterior, transparent portion, the cornea, is the first ocular component traversed by incoming light, and, for those vertebrates living in air, provides the greatest source of refraction towards focusing the light on the sensory portion of the eye. Nearsightedness (myopia), farsightedness (hyperopia), and astigmatism are all visual disabilities caused primarily by corneal curvature problems Inward from the cornea lies the iris, a spongy, circular diaphragm of loose, pigmented connective tissue separating the anterior and posterior chambers. An opening, the pupil, is formed in the center of the iris and enables passage of light energy therethrough. The anterior and posterior chambers are continuous with one another at the pupil, and are filled with a fluid, the aqueous humor. Intraocular pressure created by this fluid normally will maintain the eye in a distended state. A pair of muscles, the dilator and sphincter pupillae, located behind the iris, control the diameter of the pupil and thus the amount of light passing the iris.

Interiorly from the iris, and supported by thin suspensory fibers, termed ciliary zonule, lies the crystalline lens. Surrounded by an elastic capsule, which is attached to the ciliary zonule, the lens is completely cellular, and by altering shape, functions to accommodate or provide ocular adjustments for the sharp focusing of objects viewed at different distances. After passing through the lens, light energy traverses a semisolid, gelatinous vitreous body, and strikes the retina, the anterior, light-sensitive nerve membrane of the eye.

Any clouding or opacity of the eye lens is termed a cataract. The degree of cloudiness can vary markedly in cataractous lenses, and may be the result of many causes, although the majority are associated with aging, (termed senile cataracts). The essential biochemical change in an affected lens is the sclerosis of its protein, with the primary symptom one of progressively blurred vision. Cataracts are presently the leading cause of adult blindness.

Once a lens is sufficiently clouded so as to impair vision, the only treatment for cataracts is surgical removal. As is discussed in U.S. Pat. No. 4,078,564 to Spina, et al., the Egyptians are believed to be the ones to first surgically treat cataract patients by thrusting a rose thorn through the cornea and pushing the cataractous lens into the vitreous of the eye. In the 1880s, another technique was brought to bear on those senile cataracts that had advanced from the dense, hard phase to the "ripe" or soft and runny phase. Such a progression would frequently occur, over time, and when "ripe", incisions through the cornea and the anterior capsule, would permit the soft material to be flushed out. A major drawback of this procedure was the requirement that the patient wait until the cataract became "ripe", a process that might take 10–20 years, with the patient blind during this entire waiting period.

Beginning in the 1930s, a surgical technique known as Intracapsular Cataract Extraction (ICCE) was introduced, wherein the lens and its surrounding capsule are entirely removed from the eye through a large, 12-to-14 mm incision in the eye. Removal of the posterior portion of the lens capsule under the ICCE technique lays bear the vitreous, which, together with the large incision, may necessitate an extended period of post-surgical care. Additionally, with the posterior lens capsule removed, the posterior chamber implant lenses cannot be used. A subsequently developed surgical technique, Extracapsular Cataract Extraction (ECCE) also requires a large incision in the eye, but results in the removal of only the lens and its anterior covering; the posterior lens covering remains in the eye, protecting the vitreous.

The ICCE and ECCE techniques both require the use of large incisions made in the eye to permit the removal of the lens nucleus or the lens nucleus, the cortex, and the lens capsule, en masse. Beginning in 1967, a new surgical technique was described wherein the lens was fragmented into particles or emulsified by an ultrasonically vibrated tip, while still within the eye. The lens, now emulsified, would thereafter be aspirated from the anterior chamber through an incision in the cornea of much smaller chord length. This new technique, termed "Phacoemulsification" (KPE) by its originator, C. Kelman, provides insertion of the ultrasonically-vibrated tip into the eye through an incision of approximately 3 mm, with the vibrating tip thereafter placed against the cataract. The high frequency vibrations are subsequently used to emulsify the cataract.

As initially taught, the KPE procedure required the prolapse or transfer of the cataract's nucleus into the anterior chamber prior to phacoemulsification. Anterior chamber emulsification is not necessarily safer for the eye Corneal clarity is maintained in substantial part by an endothelial cell layer that pumps water against an osmotic gradient. This cell layer is apparently unable to repair/replace damaged cells by cell division, and thus when cells are damaged, a burden is placed on the remaining healthy cells to expand and migrate to "fill the void". During the course of cataract surgery, by any method, a proportion of endothelial cells is lost/damaged, primarily through direct or indirect operative trauma. Endothelial cell counts have been made, both pre- and post-operatively, and reported cell losses for anterior chamber phacoemulsification is about 34%, while the ICCE and ECCE techniques reduce this cellular loss to approximately 15%.

The large increase in endothelial cell loss, combined with tee challenging maneuvers required to obtain nuclear prolapse, has led to the development of posterior chamber phacoemulsification. In this procedure, after removal of the anterior lens capsule, the central portion of the lens is emulsified, in situ, forming a saucerized nucleus. In the more common bimanual technique, a second instrument is inserted into the anterior chamber and is used to manipulate the lens in combination with the phaco tip until a superior pole of the nucleus prolapses anteriorly into the iris plane, whereupon the prolapsed portion is emulsified The second instrument then rotates succssive portions of the nuclear periphery to the phaco tip where emulsification occurs. Eventually, the residual nucleus, now much reduced in diameter, prolapses spontaneously into the anterior chamber, and the phacoemulsification can be completed. Thereafter, the phaco tip is removed and replaced by an irrigation/aspiration tip for clean up and removal of any remaining cortex and any debris on the posterior lens capsule. If indicated, a lens implant insertion can then be initiated. Under the posterior chamber emulsification technique, endothelial cell loss improves from the anterior chamber value of 34% to a 9% loss rate.

Phacoemulsification is a procedure that is very demanding of the surgeon in terms of both surgical skill and intraoperative vigilance. A surgeon skilled in the ICCE and ECCE techniques is not automatically skilled in phaco surgery. The margin for error in KPE is small, for example, extending the initial incision 1 mm too long makes it difficult to maintain the anterior chamber in KPE, but would be irrelevant in ICCE or ECCE. A phaco surgeon must receive instructions regarding the technique and must be able to repeatedly practice the motor coordination skills required to manipulate and emulsify a lens through incisions of small chord length using both hands with equal dexterity. The advent of new intraocular lens designs, such as the "foldable" and "injectable" lenses, has further enhanced the value of KPE, since, for the first time both the cataract lens removal and the new lens replacement can be accomplished through the smaller incision that KPE affords.

The phacoemulsification technique by its very nature complicates the lens phantom-selection process. Not only is it necessary to duplicate the general ocular structure to enable practice in a simulated, controlled environment, it is also necessary to duplicate the "texture" of the cataract. If the lens phantom is unable to duplicate the ability of a cataractous lens to be emulsified and the reactions of a cataractous lens to mechanical displacement within the lens capsule as exists in a typical patient, the value of the phantom for providing phacoemulsification practice is severely reduced.

Such shortcomings are readily illustrated by the presently used animal eyes, (e.g., geese, rabbits, cows and pigs). The overall eye structure is only generally similar to a human eye. These animals, at the time of slaughter, or, when used while still alive, do not have developed cataracts. The soft lenses cannot be used to adequately demonstrate the emulsification and rotation techniques required by posterior chamber KPE. In addition, anatomical problems that are aggravated by tissue storage include corneas that are cloudy, tissue that is too tough, and chambers that are difficult to keep from collapsing.

The texture/density of some cataractous lenses resembles that of carrots, and some surgeons have resorted to the implantation of carrot disks in a silicone practice eye (Sheets Design), presently sold by the McGhan Medical Corporation. Division of 3M Company. The McGhan eye was designed to enable practice of the techniques required for replacement lens implantation, and is wholly unsuited for the practice of KPE procedures. The McGhan eye has no lens and, equally as important, has no lens capsule—nor a provision for one. Additionally, the carrot discs clog the Phaco aspiration port and tubing because they are not water soluble.

Encouraged by the continuing success of corneal implants, beginning in the late 1970's surgeons began attempting to treat a nearsighted eye by altering the curvature of the outer corneal surface, and thereby lessening the amount of refractive light bending. Termed refractive surgery, these early efforts have developed into two separate forms of surgery, radial keratotomy wherein a selected number of radial incisions are made in the cornea, and keratomileusis, which involves removing the top layer of the cornea, reshaping the removed portion, and suturing the reshaped corneal fragment back into place. Both techniques are extremely detailed. requiring the utmost skill on the part of the surgeon, both with respect to an understanding of the entire technique(s) and with respect to the motor skills required for their implementation.

SUMMARY OF THE INVENTION

The present invention has, as an underlying objective, the improvement in the known ophthalmic phantoms by utilizing a simulated lens that duplicates the texture of a cataractous lens and its ability to be mechanically rotated within a simulated lens capsule. Additionally, this invention enables the use of the actual surgical equipment to aspirate the "emulsified" phantom lens without the danger of clogging or otherwise ruining the machine. Also, since refractive procedures are becoming a more common ophthalmic treatment, the present invention, through simulated corneas, enables the surgeon to gain practice in these techniques as well.

This goal is inventably achieved by encapsulating a structured, water-sensitive composition within an outer, vinyl or vinylidene chloride copolmyer capsular wall. The water solubility enables dissolution by phacoemulsification. Anchoring the outer capsular bag within an inner eye structure retains the inner cataract phantom in a manner permitting the mechanical manipulations required to simulate KPE techniques. The ophthalmologic system is completed by providing an appropriately formed, simulated eye, including a cornea-like, outer structure, to receive the encapsulated cataract phantom and a head casting or face mask in which the eye is supported and on which the surgeon can obtain the hand positioning required for the delicate lens and corneal operations.

The surrounding base for the simulated eye consists of an outer orb, with an inner sealed posterior chamber, filled with a gel-like substance, used to simulate the vitreous body. A central opening is formed in the upper portion of the orb, with a shelf provided in the opening to receive a peripheral edge of the encapsulated lens phantom. The simulated cornea and iris are joined together to form the outer closure and are received within the orb opening in a manner that places the peripheral edge of the lens capsule between the cornea/iris cap and the orb shelf. In this manner, the lens capsule is anchored, with the inner lens restrained only as it is generally held by and within the outer capsule.

Various other objects, advantages, and features of the present invention will become readily apparently from the ensuing detailed description, and the novel features will be particularly pointed out in the appended claims.

BRIEF DESCRIPTION OF THE DRAWINGS

FIG. 1 is an exploded perspective view, with portions in phantom, showing the simulated eye structure in accordance with the present invention;

FIG. 2 is an exploded perspective view showing the simulated cornea and iris cap in accordance with the present invention;

FIG. 3 is an exploded, partial side elevational view, in section, showing a disassembled simulated eye, including a cataract phantom, in accordance with the present invention;

FIG. 4 is a view similar to FIG. 3 showing the simulated eye as assembled in accordance with the present invention;

FIG. 5 is a perspective view showing the simulated eye structure in accordance with the present invention as placed within a facial mask;

FIG. 6 is a partial side elevational view, in section, taken substantially along the lines 6—6 of FIG. 5, showing the simulated eye-receiving socket in the facial mask, in accordance with the present invention;

FIG. 8 is an enlarged elevational view, partially in section taken along the lines 8—8 of FIG. 7, showing a possible mechanism for adjustably attaching the two-piece facial casting together and the impact of such adjustable attachment on the extent to which the simulated eye projects from the eye-receiving socket;

FIG. 9 is a partial elevational view, similar to FIG. 8, showing an alternative facial casting position and its effect on the extent of projection by the simulated eye;

FIG. 10 is a partial elevational view, similar to FIGS. 8 and 9, showing a simulated eye received by the eye-receiving socket in a canted manner;

DESCRIPTION OF THE PREFERRED EMBODIMENTS

Figure 7:
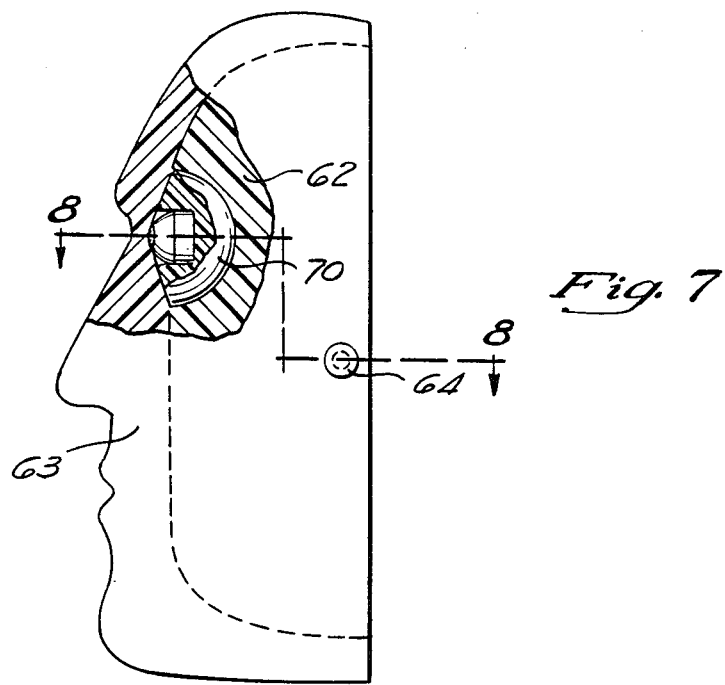
FIG. 7 is a partial side elevational view, with portions in section and portions broken away, showing a two-piece facial casting in accordance with the present invention.

The present invention relates to a phantom designed to partially simulate many of the structural characteristics of a cataractous eye. In an effort to avoid unnecessary confusion in describing the structure of this phantom, the commonly used anatomical terms will be referred to in describing the individual elements making up the ocular phantom.

To recreate/simulate the various structures and cavities of a human eye, a number of elements are fitted together within a surrounding outer orb 5. Formed in a flattened spheroid shape, the orb 5 is provided with an aperture 8 at a flattened portion thereof, with the aperture 8 communicating between the exterior of the orb 5 and a chamber 11 formed within the orb 5. The aperture 8 has a shelf 14 formed therein, of a size that cooperatively receives a posterior membrane 17, thereby sealing the chamber 11. The central portion of the posterior membrane 17 is concave towards the chamber 11, and is suitable towards receiving a double convex-shaped encapsulated lens 21. The ocular simulation is completed by an outer corneal cap 23.

As shown by FIG. 2, the corneal cap 23 in fact consists of two separate membranes, an outer cornea 26 and an iris 29 that is receivable within an inner surface of the cornea 26. As is the case with a human iris, a central opening or pupil 33 is formed therein, and in the case of the present invention, is designed to simulate a dilated pupil, which is the opening through which the cataract removal technique is performed. To assist the surgeon in this regard, every effort is made to completely dilate the pupil. However, responsiveness to the dilating drugs can vary, and to enable surgeons to practice the techniques required for such an eventuality, the iris 29 may be provided with pupil openings of varying sizes, such as 5, 7½, and 9½ mm.

For purposes of simulation, it is preferred that the cornea 26 be flexible and moisture tight. An appropriate material for the cornea 26 is a molded, clear and transparent silicone, 40-50 shore D. Likewise, a preferred composition for the iris portion, resulting in a less rigid construction, is a high elongation, molded silicone that is appropriately pigmented. Although the present lens phantom system is designed to teach posterior chamber KPE, it is also possible to practice the techniques of anterior chamber KPE, in which case the iris 29 can be constructed out of materials more closely simulating the mechanical properties of a human iris. Likewise, when this ocular phantom system is used to simulate refractive procedures, such as astigmatic keratotomy and radial keratotomy, the cornea can be manufactured out of a material(s) that more closely duplicates the surgical responses of a human cornea. Such material includes, for example, a material that is used in the fabrication of contact lenses and has the fabrication of contact lenses and has the following constituents:

| Reagent | Parts by Weight |
| --- | --- |
| 2-hydroxyethy-methacrylate | 78% |
| N—vinyl-2-pyrrolidone | 20% |
| ethylene glycol dimethacrylate | 1% |
| 2,2-azobis isobutyronitrile (AIBN) | ½% |

For ease of fabrication, the iris 29 and the cornea 26 also may be bonded together subsequent to their original manufacture, and thereafter be utilized in conjunction with the ocular simulation as the unitary corneal cap 23.

As shown best in FIG. 3, each of the individual ocular elements is arranged to receive and be received in a compact, stacked manner. A posterior membrane ledge 37 is formed about the periphery of the posterior membrane 17 and is received by the shelf 14 within the aperture 8. The peripheral edge of the encapsulated lens 21 is likewise flattened and mates with the flattened peripheral edge of the posterior membrane 17 when both are received within the aperture 8. The simulated anterior and posterior chambers are completed by the corneal cap 23, which is likewise received within the aperture 8. A flattened lower edge 41 of the corneal cap 23 is received and supported by the orb shelf 14, with an inner corneal wall 43 of sufficient diameter to receive both the encapsulated lens 21 and the posterior membrane 17 when the lower corneal edge 41 abuts the orb shelf 14. In this manner, the encapsulated lens 21 is securely retained about its peripheral edge between the corneal cap 23 and the posterior membrane 17, which is itself attached to the shelf 14 of the orb 5 (also see FIG. 4).

The chamber 11 corresponds generally to the vitreous in a human eye. The simulation under the present invention is further obtained and the practicing of vitrectomy techniques made possible by providing a vitreous body 47 within the chamber 11. Any type of viscous fluid can function as the vitreous body 47, and a silicone gel is certainly appropriate. Whichever material is selected, the vitreous body 47 is maintained in place within the chamber 11 by the posterior membrane 17, which, in a preferred embodiment, is adhesively attached to the shelf 14. To enable the surgeon to monitor progress utilizing the red reflex, it is preferred to color either the vitreous body 47 or the back wall of the chamber 11, with red the appropriate color in either circumstance.

As is best shown in FIG. 3, the encapsulated lens 21 consists of a clear, outer capsular wall 51, such as a vinyl film (e.g.,saran) or vinylidene chloride copolymer film, and an inner cataract phantom 53, composed of a structured, water-soluble composition, designed to be similar to that found in the natural occurring cataract. In order to retain the same emulsification characteristics under the phaco instrument, a permanent hydrogel material is provided utilizing a cross-linked gelatin. This material is "hydrated" or provided with the proper water sensitivity by the incorporation of a water-soluble polymer, such as sodium alginate, polyethylene glycol or a guar gum—e.g., Gelactasol 211 manufactured by the Henkel Corporation, Minneapolis, Minn.

The term "cataract" merely refers to a lens suffering some degree of opacity. The cataractous lens can vary from being soft to extremely hard as maturity increases. The soft and runny phase exists typically in only very advanced stages (hyper-mature), and such patients are exceedingly rare. Eye surgeons must normally contend with cataracts varying from very hard to merely soft, and the techniques required under phacoemulsification will understandably differ according to the "hardness" of the cataract A soft cataract is much easier to emulsify, but can be more difficult to manipulate. On the other hand, a cataract can become sufficiently hard that it tends to fragment rather than to emulsify. In such an event, the damage to the endothelial cornea cells of the eye suffered by rebounding pieces of lens, in addition to the prolonged intraocular phaco-time, was traditionally sufficient to warrant converting mid-operation to a different technique for cataract removal, i.e., ECCE. The advent of viscoelastic coating materials for the inner surface of the cornea has lessened the necessity for converting to a non-phacoemulsification method. These materials are sold under various trade names such as "Healon," "Viscoat," and "Amvisc," and may be used with the present ocular phantom system to enable the surgeon to practice the technique of performing Phaco in the presence of these substances, and PKE on a hard lens using such coating materials.

Under the present invention, the hardness of the phantom cataract is controlled by the addition of fillers such as 50 to 200 micron-sized glass beads or 50 to 200 micron organic fillers having solubilities of less than 5% in water, such as tetramethyl-1,3-cyclobutanediol. Alternatively, phantom "soft" cataracts can be prepared without gelatin using a calcium chloride, cross-linked sodium alginate. It is important that the phantom cataracts resemble human cataracts both in emulsification characteristics, (or "disintegration characteristics" for whichever removal technology is employed), and in translucency to ensure that the simulation will be as close to an actual removal procedure as is possible.

The following examples illustrate some preferred embodiments of the present invention:

Three stock solutions (A, B, and C) of gelatin in water were prepared in advance and heated to 40° C. to melt.

| Reagent | STOCK SOLUTIONS, (% by weight) | | |
|---|---|---|---|
| | A | B | C |
| Gelatin | 26 | 26 | 10 |
| Hyamine - 1622 | 0.2 | 0.2 | 0.2 |
| Sodium Benzoate | 0.2 | 0.2 | 0.2 |
| Napthol Green B | — | 0.038 | — |
| Red CAS | — | 0.048 | — |
| Methyl Orange | 0.005 | — | 0.004 |

EXAMPLE 1

Soft Cataract

| Reagent | Parts by Weight |
|---|---|
| Gelatin stock solution "A" | 1 |
| Sodium alginate (5% aqueous solution) | 2 |
| Water | 5 |
| Formalin | 0.2 |

After cooling, the resulting material provided an excellent simulation of a soft cataract.

EXAMPLE 2

Medium-Hard Cataract

| Reagent | Parts by Weight |
|---|---|
| Gelatin stock solution "A" | 1 |
| Sodium alginate (5% aqueous solution) | 5 |
| Tetramethyl-1,3-cyclobutanediol | 2 |
| Formalin | 0.2 |

This material, after cooling, provided a simulation of a medium-hard cataract.

EXAMPLE 3

Hard Cataract

| Reagent | Parts by Weight |
|---|---|
| Gelatin stock solution "A" | 1 |
| Sodium alginate (5% aqueous solution) | 3 |
| Tetramethyl-1,3-cyclobutanediol | 5 |
| Formalin | 0.2 |

After cooling, this material provided an excellent simulation of a hard cataract.

EXAMPLE 4

Clear, Soft Cataract

| Reageant | Parts by Weight |
|---|---|
| Gelatin stock solution "C" | 2 |
| Polyethylene glycol - 200 | 3 |
| 37% Formaldehyde solution | 0.4 |

After cooling, this material provided an excellent, clear simulation of a soft cataract.

EXAMPLE 5

Transparent, Medium-Hard Cataract

| Reageant | Parts by Weight |
|---|---|
| Gelatin stock solution "B" | 2 |
| Polyethylene glycol - 200 | 2.5 |
| Tetramethyl-1,3-cyclobutanediol | 1 |
| 37% Formaldehyde solution | 0.4 |

Upon cooling, this material provided a transparent simulation of a medium-hard cataract.

EXAMPLE 6

Translucent, Hard Cataract

| Reageant | Parts by Weight |
|---|---|
| Gelatin stock solution "A" | 2 |
| Polyethylene glycol - 200 | 2.5 |
| Tetramethyl-1,3-cyclobutanediol | 2.5 |
| 37% Formaldehyde solution | 0.4 |

When cool, this material provided an excellent simulation of a translucent, hard cataract.

Regardless of the material used to form the cataract phantom 53, once placed in the assembled form for simulating the human eye, as shown in cross-section in FIG. 4, this simulated ocular system is ready for use by one desiring to practice all refractive procedures, the phacoemulsification techniques, and any other techniques that makes use of a cornea, or a cataract or lens capsule, such as the small incision implants. The corneal material also enables the surgeon to practice suture placement, either with respect to refractive procedures or for lens replacement.

In a preferred embodiment, a completed ocular system 55 is placed within a casting 57 that is generally designed to resemble a human head. As is shown in FIG. 6, a socket 61 is formed within the casting 57, and receives the simulated ocular system 55. In an embodiment shown in FIG. 7, a two-piece casting is utilized to enable the variable positioning of the ocular system 55. One or preferably both pieces are formed out of polyurethane, but of course could be manufactured out of a wide variety of materials, and it is not essential that both pieces are formed out of the same material. An inner casting 62 is received within an outer mask 63, with fastening means such as one or more pins 64 (only one shown) used to maintain the inner casting 62 and the outer mask 63 in a nested relationship.

As is best shown by FIG. 8, the inner casting 62 and the outer mask 63 are substantially, but not completely, in a nested relationship prior to utilization of the fastening pins 64. In the presently preferred embodiment, when first placed within the outer mask 63, the inner casting 62 is not fully received by the outer mask 63, to the extent that an aperture 66 formed in the inner casting 62 is slightly offset with respect to a pin-receiving opening 67 formed in the outer mask 63.

This slight offset serves as an adjustment mechanism for controlling the extent to which the optical system 55 projects or hyperextends from the surrounding surface of the outer mask 63. In this manner, different internal ocular pressures can be simulated by the present system. As the pin 64 is inserted into the outer mask 63 and then the aperture 66, the inner casting 62 is forced further into a nested relationship with the outer mask 63. Where the pin 64 is provided with threads (as is shown in FIG. 8). upon tightening the pin 64, the slight angle of the aperture 65 causes the inner casting 62 to move further into the outer mask 63. The net result of this relative forward movement is a pressing of the ocular system 55 against a peripheral restraining seat 69 formed in the outer mask 63. This pressure causes a bulging of the ocular system 55, as measured by the dimensional changes denoted by the distances A and B in FIGS. 8 and 9, respectively.

The angular position of the ocular system 55 with respect to the outer mask 63 may be preset, or a rotating insert 70 (FIG. 7) may be provided as part of the inner casting 62. In such circumstances, the ocular system 55 may be placed in selectively rotated positions with respect to the adjacent non-rotating portions of the inner casting 62 and the outer mask 63. FIG. 10 illustrates an alternative to the rotating insert 70, wherein the ocular system 55 is placed within casting 57 in a canted position, shown as angle in FIG. 10. In either case, the angular positioning of the ocular system 55 can be varied, which resembles the variations possible during actual operations to assist the surgeon in performing many of the removal techniques.

Whether in regard to the phacoemulsification techniques, practicing suture placement(s), or in perfecting the skills required for refactive surgery, one of the more important benefits provided by the present invention relates to the realistic spatial relationship provided by the ocular system 55 within the casting 57. In such delicate surgery, hand positioning is of utmost importance, and the ability to perform the necessary techniques on tissue phantoms positioned in a proper spatial relationship as compared to their normal environment in vivos, is a significant achievement.

Figure 11:
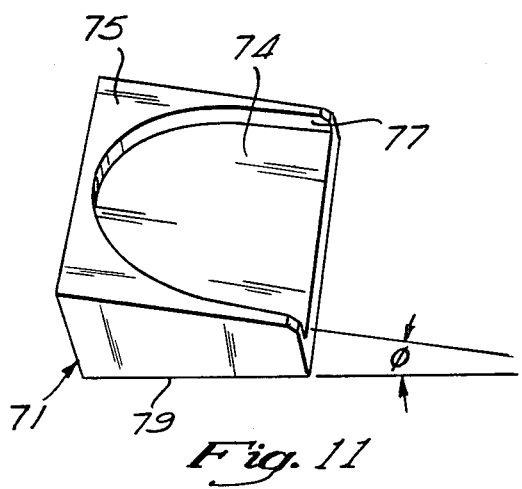
FIG. 11 is a perspective view showing a chin support wedge in accordance with the present invention.
Figure 12:
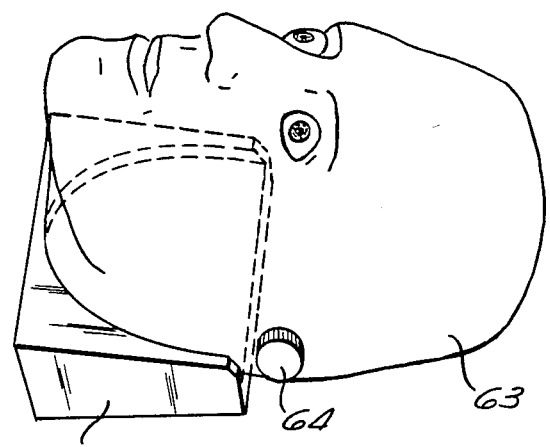
FIG. 12 is a perspective view, partially in phantom, the facial casting as placed upon the chin support wedge in accordance with the present invention.

The head of a patient is not angularly fixed with respect to body, and it is sometimes desirable to perform one or more of the foregoing techniques at varying head angles. Variations in chin positioning are made possible through the use of a chin wedge 71. As is shown in FIG. 11, the chin wedge 71 is generally block-like, with a planar receiving surface 74 recessed from and partially surrounded by an outer surface 75. The receiving surface 74, being recessed, is defined by and defines a retaining wall 77 of a shape corresponding to a portion of the circumference of the outer mask 63 adjacent the simulated chin. The outer mask 63 may thus be received by the receiving surface 74 and held in place by the retaining wall 77. Such a complete construction is illustrated in FIG. 12. The purpose of the chin wedge 71 is to vary the tilt angle of the simulated head. This is accomplished by placing the outer surface 75, (and thus the recessed receiving surface 74), in a plane that forms an angle $\phi$ with respect to the plane containing a base surface 79 of the chin wedge 71. The simulated head, (the outer mask 63 and the inner casing 62), is thus received by the receiving surface 74, which is displaced by the angle $\phi$ from the supporting surface for the base surface 79 and the remainder of the simulated head. In this manner, the tilt angle of the simulated head has been altered in preparation for the practicing of one or more of the foregoing techniques. The angle $\phi$ preferably lies between 15°–35°, but other angels are acceptable.

One of the removal techniques is schematically demonstrated in FIG. 5. A surgeon's hand 86 is resting upon the casting 57 in a manner permitting the manipulation of an emulsification tool 88 according to a particular cataract removal technique. The emulsification tool 68 can be an ultrasonic tip, but, of course, the present invention is not limited to the precise mechanism of lens emulsification or disintegration, and any other technology resulting in lens or corneal destruction or modification would be appropriate, e.g., lasers. The preferred embodiment also provides a pre-formed incision in the cornea 26 to allow for the proper tension in the cornea, and to limit the opening to a specific size, 3 mm is traditional for KPE, but other opening dimensions are possible depending upon the application. For example, larger pre-formed incisions are provided to enable the simulation of a lens transplant surgical procedure. Whatever the incision length, the posterior chamber phacoemulsification technique may then be performed through the pupil 33 in the iris 29. The outer capsular wall 51 (the anterior lens membrane) is removed and the cataract phantom 53 subsequently emulsified and removed through aspiration.

While we have disclosed exemplary structures to illustrate the principles of the present invention, it should be understood that we wish to embody within the scope of the patent warranted hereon, all such modifications as reasonably and properly come within the scope of our contribution to the art.

We claim:

1. An ophthalmologic system comprising:
   an ocular tissue phantom placed in and retained by a structure generally resembling a human eye at a location simulating a location for such ocular tissue in a human eye;
   a display stand receiving said ocular tissue phantom, said display stand having at least one eye socket formed therein, with a mounting surface formed adjacent the ocular tissue phantom generally resembling a facial surface surrounding an eye in a human head; and
   means for adjusting the position of the eye within the eye socket.

2. An ophthalmologic system as described in claim 1, wherein said simulated human head comprises an outer mask covering and attached to an inner casting.

3. An ophthalmologic system as described in claim 2, wherein the eye socket is formed in said inner casting and said outer mask may be adjustably moved with respect to said inner casting to alter the position of the eye.

4. An ophthalmologic system as described in claim 1, and further comprising means for adjusting the angular positioning of the simulated head.

5. An ophthalmologic system as described in claim 4, wherein said angular adjusting means comprises a chin wedge.

6. An ophthalmologic system as described in claim 1, wherein said ocular tissue phantom comprises a lens tissue phantom.

7. An ophthalmologic system as described in claim 1, wherein said ocular tissue phantom comprises a corneal tissue phantom.

8. A display stand for ocular surgical procedure simulations comprising:
   a facial surface, said facial surface of a size and a shape that generally resembles the facial features of a human being;
   a means for mounting an ocular phantom in said facial surface, at a location corresponding to an appropriate location for said ocular phantom with respect to said human facial features;
   means for positioning said facial surface in a manner that simulates a head of a patient during an ocular surgical procedure; and
   an inner casting that is sized to receive said facial surface, wherein said means for mounting comprises an aperture formed within a surface of said inner casting.

9. A display stand as described in claim 8, wherein said facial surface comprises a facial mask having at least one throughbore formed therein to permit access to said ocular phantom to permit said ocular phantom to project therefrom.

10. A display stand as described in claim 9, wherein said facial mask is received by said inner casting in a manner forming an offset, permitting adjustments in positioning said ocular phantom with respect to said facial mask.

11. A display stand as described in claim 10, and further comprising means for adjusting the relative position of said facial mask and said inner casting within such a range as is permitted by said offset.

12. An ophthalmoligic system comprising:
   a corneal tissue phantom placed in and retained by a structure generally resembling a human eye at a location simulating a location for such ocular tissue in a human eye, said corneal tissue phantom comprising 2-hydroxyethymethacrylate in an amount of 78% by weight, N-vinyl-2-pyrrolidone in an amount of 20% by weight, ethylene glycol dimethacrylate in an amount of 1% by weight, and 2, 2-azobis isobutyronitril (AIBN) in an amount of ½% by weight.

* * * * *